United States Patent
Maeda

(10) Patent No.: US 11,473,539 B1
(45) Date of Patent: Oct. 18, 2022

(54) INTAKE MANIFOLD

(71) Applicant: TOYOTA BOSHOKU KABUSHIKI KAISHA, Aichi-ken (JP)

(72) Inventor: Kunitaka Maeda, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/722,107

(22) Filed: Apr. 15, 2022

(30) Foreign Application Priority Data

Apr. 20, 2021 (JP) .............................. JP2021-070947

(51) Int. Cl.
*F02M 35/10* (2006.01)

(52) U.S. Cl.
CPC ................ *F02M 35/10295* (2013.01); *F02M 35/10144* (2013.01); *F02M 35/10262* (2013.01)

(58) Field of Classification Search
CPC ....... F02M 35/10295; F02M 35/10144; F02M 35/10262; F02M 35/104; F02M 35/10157; F02M 35/10236
See application file for complete search history.

(56) References Cited

U.S. PATENT DOCUMENTS

2018/0372039 A1* 12/2018 Sakurai ............ F02M 35/10052
2019/0136805 A1*  5/2019 Tanaka ................. F02M 35/104
2020/0400109 A1* 12/2020 Maeda ............. F02M 35/10157

FOREIGN PATENT DOCUMENTS

JP        2008-121469 A      5/2008

* cited by examiner

*Primary Examiner* — Syed O Hasan
(74) *Attorney, Agent, or Firm* — Greenblum & Bernstein, P.L.C.

(57) ABSTRACT

An intake manifold includes a surge tank, an inlet pipe, and intake pipes. The surge tank includes a curved portion and a bulging portion. The curved portion forms a curved outer wall of the surge tank and includes an inner surface that is continuous with inner surfaces of entrances of the intake pipes. The bulging portion bulges into the surge tank toward the curved portion and overlaps with an imaginary extension of an exit of the inlet pipe into the surge tank. The bulging portion includes a flow changing portion. The flow changing portion is configured to direct a flow of intake air toward a section that is more interior into the surge tank than the bulging portion in relation to the inlet pipe and located on part of the inner surface of the surge tank that is continuous with the inner surface of the curved portion.

3 Claims, 2 Drawing Sheets

INTAKE MANIFOLD

BACKGROUND

1. Field

The present disclosure relates to an intake manifold.

2. Description of Related Art

An internal combustion engine includes an intake manifold. The intake manifold is configured to supply air (intake air) to cylinders of the internal combustion engine.

Japanese Laid-Open Patent Publication No. 2008-121469 discloses an intake manifold that includes a surge tank, an inlet pipe, and intake pipes. The surge tank is formed to have a predetermined length. The inlet pipe is connected to one end in the longitudinal direction of the surge tank. The intake pipes are arranged in the longitudinal direction of the surge tank and connected to the surge tank. The intake pipes are curved so as to wrap around the surge tank. This reduces the size of the intake manifold.

The intake pipes of the intake manifold are respectively connectable to the cylinders of an internal combustion engine. When the internal combustion engine is operating, vacuum is produced in each cylinder. The vacuum draws intake air from the inlet pipe into the surge tank. The intake air is then distributed to the intake pipes from the surge tank, and then supplied to the respective cylinders of the internal combustion engine through the intake pipes.

In the intake manifold disclosed in the above-described publication, the intake air that has flowed into the surge tank from the inlet pipe flows in the surge tank in the longitudinal direction of the surge tank. Since the intake pipes are arranged in the longitudinal direction of the surge tank and connected to the surge tank, the flowing direction of the intake air must be changed significantly in order to cause the intake air to flow from the surge tank to the intake pipes.

However, it is not easy to change the flowing direction of intake air significantly, and failure to smoothly change the flowing direction of the intake air intensifies turbulence of the intake air in the surge tank. This increases the airflow resistance at a time when the intake air passes through the intake manifold.

SUMMARY

In one general aspect, an intake manifold is provided that includes a surge tank having a specified length, an inlet pipe connected to one end, in a longitudinal direction, of the surge tank, and intake pipes that are arranged in the longitudinal direction and connected to the surge tank. The intake pipes are curved so as to wrap around the surge tank and connectable to respective cylinders of an internal combustion engine. The surge tank includes a curved portion and a bulging portion. The curved portion forms a curved outer wall of the surge tank and includes an inner surface that is continuous with inner surfaces of entrances of the intake pipes. The bulging portion is located at a position in the surge tank that is close to the inlet pipe and bulges into the surge tank toward the curved portion. The bulging portion overlaps with an imaginary extension of an exit of the inlet pipe into the surge tank. The bulging portion includes a flow changing portion at a position that is farthest from the curved portion. The flow changing portion is configured to direct a flow of intake air that has flowed into the surge tank from the inlet pipe toward a section. The section is more interior into the surge tank than the bulging portion in relation to the inlet pipe and located on part of an inner surface of the surge tank that is continuous with the inner surface of the curved portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An intake manifold according to an embodiment will now be described with reference to FIGS. 1 to 3.

Figure 1:
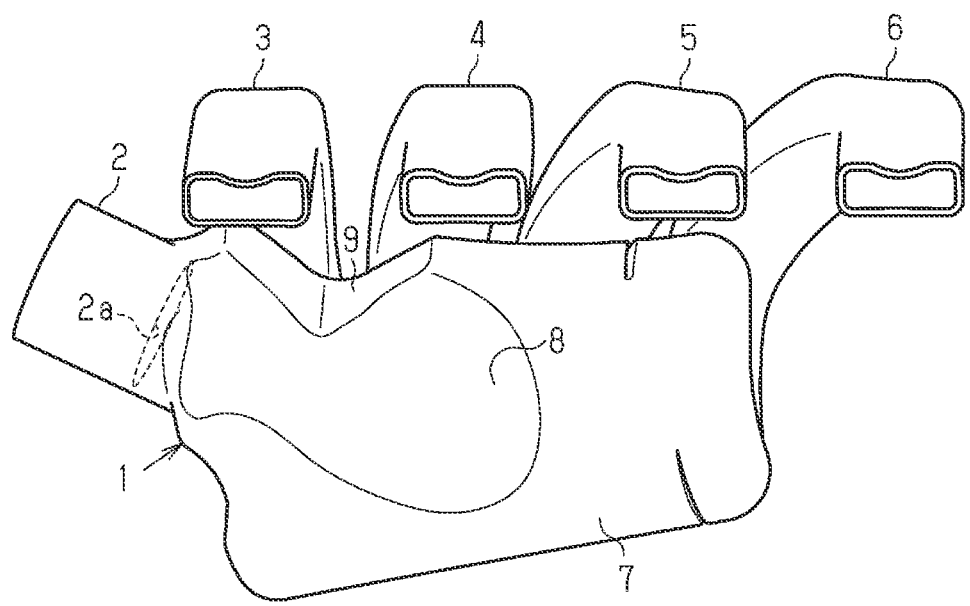
FIG. 1 is a front view showing an intake manifold.
Figure 2:
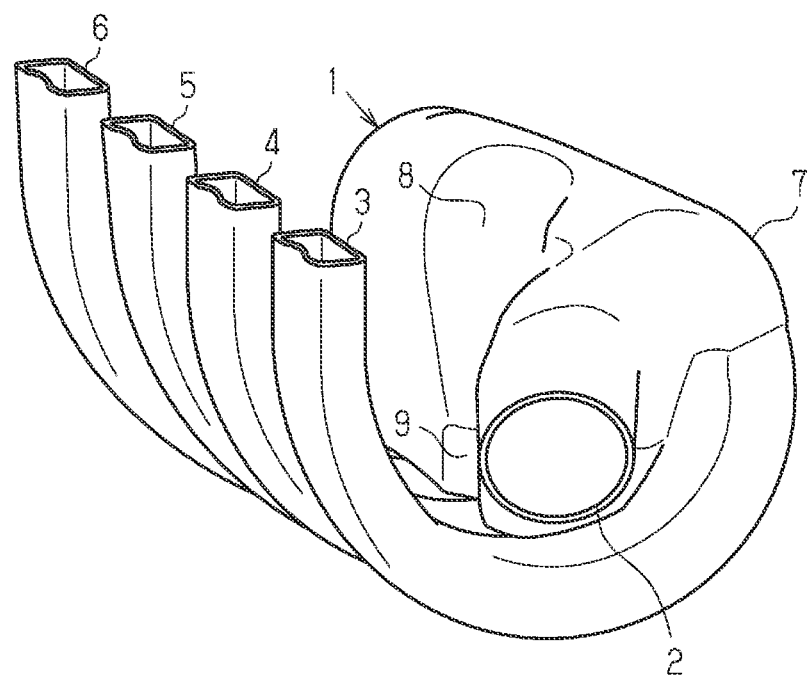
FIG. 2 is a perspective view showing the intake manifold.

The intake manifold shown in FIGS. 1 and 2 is configured to supply air (intake air) to cylinders of an internal combustion engine. The intake manifold includes a surge tank 1 having a specified length and an inlet pipe 2 connected to one end in the longitudinal direction (left-right direction as viewed in FIG. 1) of the surge tank 1. An exit 2a of the inlet pipe 2 opens in the surge tank 1.

The intake manifold includes intake pipes, which are a first intake pipe 3, a second intake pipe 4, a third intake pipe 5, and a fourth intake pipe 6. The first to fourth intake pipes 3 to 6 are arranged in the longitudinal direction of the surge tank 1 and connected to the surge tank 1. The first to fourth intake pipes 3 to 6 are curved so as to wrap around the surge tank 1. This reduces the size of the intake manifold.

Figure 3:
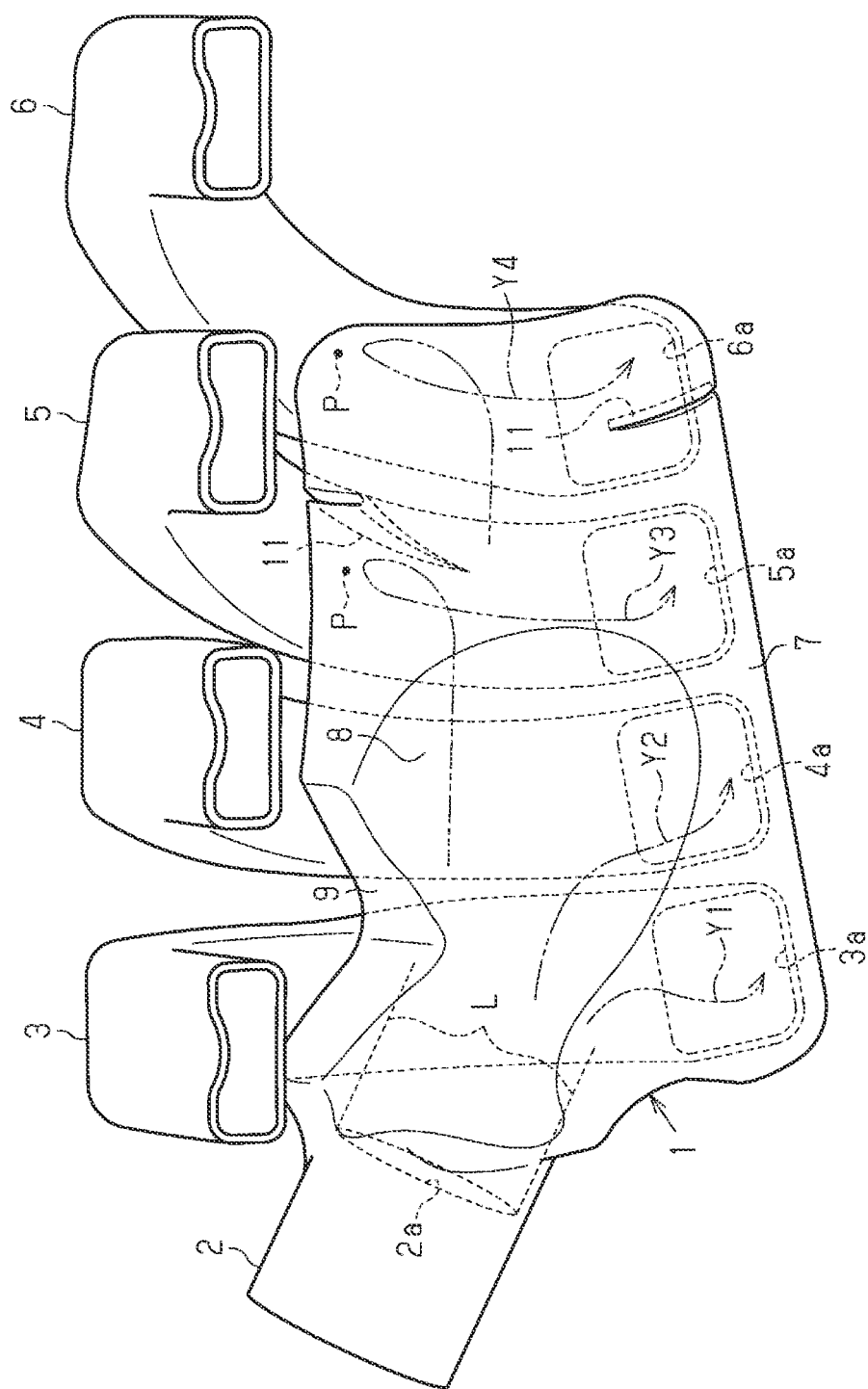
FIG. 3 is a front view of the intake manifold, illustrating a positional relationship between an inlet pipe, a bulging portion of a surge tank, and entrances of first to fourth intake pipes.

As shown in FIG. 3, an entrance 3a of the first intake pipe 3, an entrance 4a of the second intake pipe 4, an entrance 5a of the third intake pipe 5, and an entrance 6a of the fourth intake pipe 6 open to the interior of the surge tank 1. The first to fourth intake pipes 3 to 6 are connectable to the respective cylinders of the internal combustion engine. When the internal combustion engine is operating, vacuum is produced in each cylinder. The vacuum draws intake air from the inlet pipe 2 into the surge tank 1. The intake air is then distributed to the first to fourth intake pipes 3 to 6 from the surge tank 1, and then supplied to the respective cylinders of the internal combustion engine through the intake pipes 3 to 6.

As shown in FIGS. 1 and 2, the surge tank 1 includes a curved portion 7 and a bulging portion 8. The curved portion 7 forms a curved outer wall of the surge tank 1. The inner surface of the curved portion 7 is continuous with the inner surfaces of the entrances 3a to 6a (FIG. 3) of the first to fourth intake pipes 3 to 6. As shown in FIG. 1, the bulging portion 8 is located at a position in the surge tank 1 that is close to the inlet pipe 2, and bulges into the surge tank 1 toward the curved portion 7. The bulging portion 8 overlaps with an imaginary extension L of the exit 2a of the inlet pipe 2 into the surge tank 1 (FIG. 3).

As shown in FIG. 3, the bulging portion 8 includes a flow changing portion 9 at a position that is farthest from the curved portion 7. The flow changing portion 9 is formed by forming the outer wall of the surge tank 1 into a V-shape. The flow changing portion 9 is configured to direct the flow of intake air that has flowed into the surge tank 1 from the inlet pipe 2 toward sections P, which are more interior into the surge tank 1 than the bulging portion 8 in relation to the inlet pipe 2. The sections P are more interior than the bulging portion 8 and located on part of the inner surface of the surge tank 1 that is continuous with the inner surface of the curved portion 7.

The surge tank 1 includes a flow regulating plate 11 in a section that is farther from the inlet pipe 2 than the bulging portion 8. The flow regulating plate 11 extends along the curve of the curved portion 7.

Operation of the intake manifold according to the present embodiment will now be described.

Intake air that has flowed into the surge tank 1 from the inlet pipe 2 hits the bulging portion 8 and thus flows along the bulging portion 8. As a result, the flowing direction of the intake air is gradually changed to a direction toward a section of the curved portion 7 that is close to the inlet pipe 2. Further, since the intake air flows along the curvature of the section of the curved portion 7 that is close to the inlet pipe 2, the intake air flows in a direction in which the first intake pipe 3 and the second intake pipe 4, which are relatively close to the inlet pipe 2, extend. In other words, as shown in FIG. 3, the flowing direction of the intake air is smoothly changed to a direction toward the entrance 3a of the first intake pipe 3, which is indicated by arrow Y1, and a direction toward the entrance 4a of the second intake pipe 4, which is indicated by arrow Y2. This allows the intake air to efficiently flow into the entrance 3a of the first intake pipe 3 and the entrance 4a of the second intake pipe 4.

When hitting the flow changing portion 9 formed in the bulging portion 8, intake air that has flowed into the surge tank 1 from the inlet pipe 2 flows to a part that is more interior into the surge tank 1 than the bulging portion 8 in relation to the inlet pipe 2. More specifically, the intake air flows toward the sections P, which are more interior than the bulging portion 8 in the surge tank 1 and located on part of the inner surface of the surge tank 1 that is continuous with the inner surface of the curved portion 7. After hitting the sections P, the intake air flows along the inner surface of the curved portion 7 that is continuous with the sections P. As a result, the intake air flows in a direction in which the third intake pipe 5 and the fourth intake pipe 6, which are relatively far away from the inlet pipe 2, extend. In other words, as shown in FIG. 3, the flowing direction of the intake air is smoothly changed to a direction toward the entrance 5a of the third intake pipe 5, which is indicated by arrow Y3, and a direction toward the entrance 6a of the fourth intake pipe 6, which is indicated by arrow Y4. This allows the intake air to efficiently flow into the entrance 5a of the third intake pipe 5 and the entrance 6a of the fourth intake pipe 6.

As described above, when intake air flows from the surge tank 1 to the first to fourth intake pipes 3 to 6, the flowing direction of the intake air is smoothly changed to the directions toward the entrances 3a to 6a of the first to fourth intake pipes 3 to 6. This prevents turbulence in the flow of intake air in the surge tank 1 from being intensified when the intake air flows to the first to fourth intake pipes 3 to 6 from the surge tank 1. Accordingly, the airflow resistance at a time when the intake air passes through the intake manifold will not be increased due to intensification of turbulence of the intake air in the surge tank 1.

The present embodiment, as described above, has the following advantages.

(1) The airflow resistance at a time when intake air passes through the intake manifold is prevented from increasing.

(2) The surge tank 1 includes the flow regulating plate 11 in a section that is farther from the inlet pipe 2 than the bulging portion 8. The flow regulating plate 11 extends along the curve of the curved portion 7. The flow regulating plate 11 has the effects described below on the flow of intake air in the surge tank 1. That is, the flow changing portion 9 formed in the bulging portion 8 causes intake air in the surge tank 1 to flow toward the sections P, which are more interior than the bulging portion 8 in the surge tank 1 in relation to the inlet pipe 2 and located on part of the inner surface of the surge tank 1 that is continuous with the inner surface of the curved portion 7. The intake air flows in a direction in which the third intake pipe 5 and the fourth intake pipe 6, which are relatively far away from the inlet pipe 2, extend. The flow regulating plate 11 suppresses turbulence of the flow of the intake air. Thus, it is easy to create flows of intake air in directions along the third intake pipe 5 and the fourth intake pipe 6 at positions in the surge tank 1 that are far away from the inlet pipe 2.

The above-described embodiment may be modified as follows. The above-described embodiment and the following modifications can be combined as long as the combined modifications remain technically consistent with each other.

The flow regulating plate 11 does not necessarily have to be provided.

The flow changing portion 9 does not necessarily need to have a V-shape. For example, a flow changing portion having a different shape may be used.

The flow changing portion may be formed, for example, a rib.

The intake manifold according to the above-described embodiment has four intake pipes, namely, the first to fourth intake pipes 3 to 6. However, the number of the intake pipes of the intake manifold may be changed, for example, in accordance with the number of the cylinders of the internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An intake manifold, comprising: a surge tank having a specified length; an inlet pipe connected to one end, in a longitudinal direction, of the surge tank; and intake pipes that are arranged in the longitudinal direction and connected to the surge tank, wherein the intake pipes are curved so as to wrap around the surge tank and connectable to respective cylinders of an internal combustion engine, the surge tank includes a curved portion and a bulging portion, the curved portion forms a curved outer wall of the surge tank and includes an inner surface that is continuous with inner surfaces of entrances of the intake pipes, the bulging portion is located at a position in the surge tank that is adjacent to the inlet pipe and bulges into the surge tank toward the curved portion, the bulging portion overlapping with an imaginary extension of an exit of the inlet pipe into the surge tank, the bulging portion includes a flow changing portion at a position that is farthest from the curved portion, and the flow changing portion is configured to direct a flow of intake air that has flowed into the surge tank from the inlet pipe toward a section, the section being more interior into the surge tank than the bulging portion in relation to the inlet pipe and located on part of an inner surface of the surge tank that is continuous with the inner surface of the curved portion.

2. The intake manifold according to claim 1, wherein the flow changing portion is formed by forming the outer wall of the surge tank into a V-shape.

3. The intake manifold according to claim 1, wherein the surge tank includes a flow regulating plate in a section that is farther from the inlet pipe than the bulging portion, the flow regulating plate extending along a curve of the curved portion.

* * * * *